Oct. 14, 1924.
A. J. WALTERMIRE
MEASURING DEVICE
Filed Aug. 5, 1922
1,511,586
2 Sheets-Sheet 1
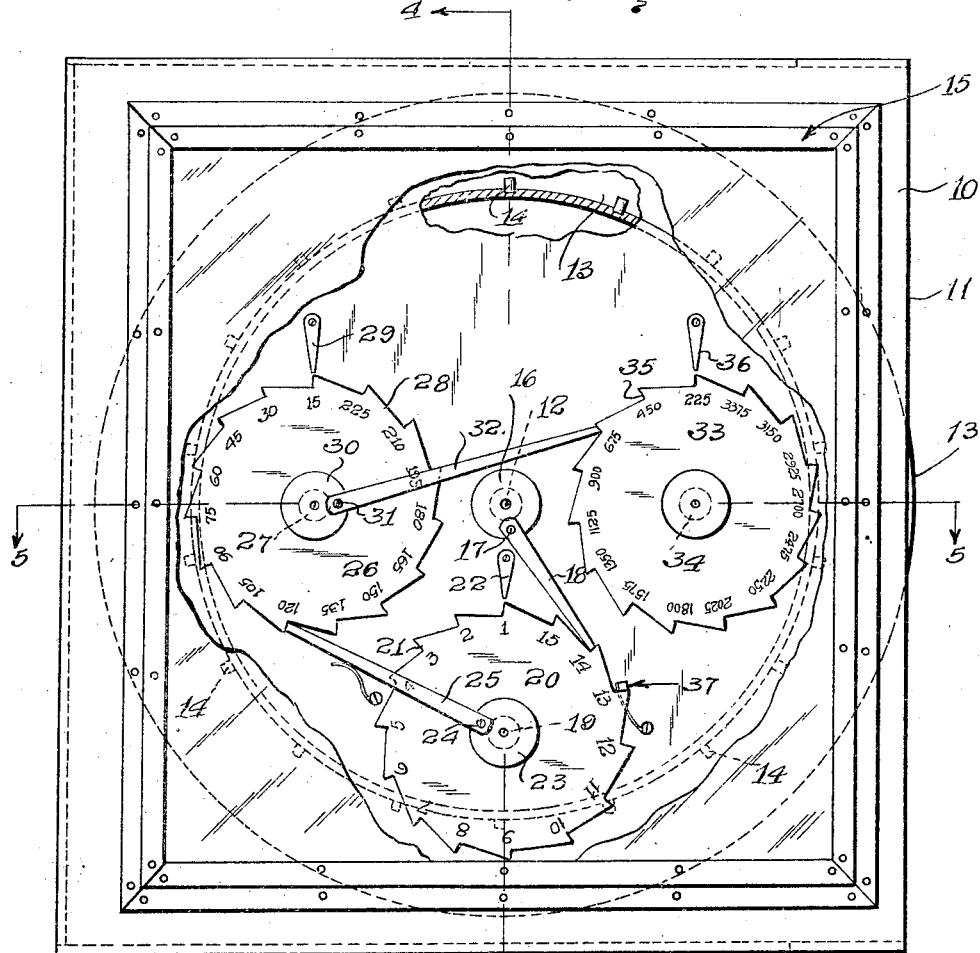
Fig. 1.
Fig. 2.
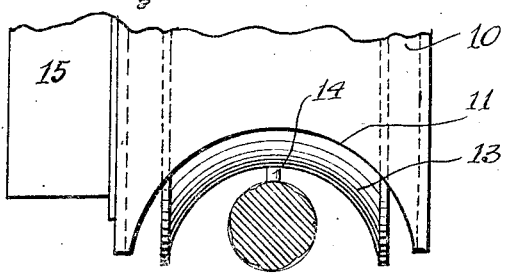
Fig. 3.
Inventor
Andrew J. Waltermire
By Watson E. Coleman
Attorney Oct. 14, 1924.

A. J. WALTERMIRE

MEASURING DEVICE

Filed Aug. 5, 1922

Inventor

Andrew J. Waltermire

By Watson E. Coleman

Attorney

Patented Oct. 14, 1924.

1,511,586

UNITED STATES PATENT OFFICE.

ANDREW J. WALTERMIRE, OF BATESVILLE, ARKANSAS.

MEASURING DEVICE.

Application filed August 5, 1922. Serial No. 579,914.

*To all whom it may concern:*

Be it known that I, ANDREW J. WALTERMIRE, a citizen of the United States, residing at Batesville, in the county of Independence and State of Arkansas, have invented certain new and useful Improvements in Measuring Devices, of which the following is a specification, reference being had to the accompanying drawings.

This invention relates to measuring devices, and particularly to mechanism for measuring rope, cloth or like materials.

The general object of the invention is to provide a very simple mechanism to this end which includes a wheel against which the rope, cloth or other material is relatively moved, the wheel rolling upon the cloth or rope and the wheel actuating counting mechanism whereby the number of feet, yards or other amount of rope or cloth is indicated.

A further object is to provide a device of this character which is very simple, compact, which may be moved over the material to be measured or against which the material to be measured may be moved, and in which the indicating dials may be easily read.

Other objects will appear in the course of the following description.

My invention is illustrated in the accompanying drawings, wherein:—

Figure 1 is a side elevation of a measuring device constructed in accordance with my invention partly broken away;

Figure 2 is a fragmentary top plan view of the right hand end of the casing 10, the rope being shown in section;

Figure 3 is a fragmentary edge elevation of a measuring wheel as used for measuring cloth;

Figure 4:
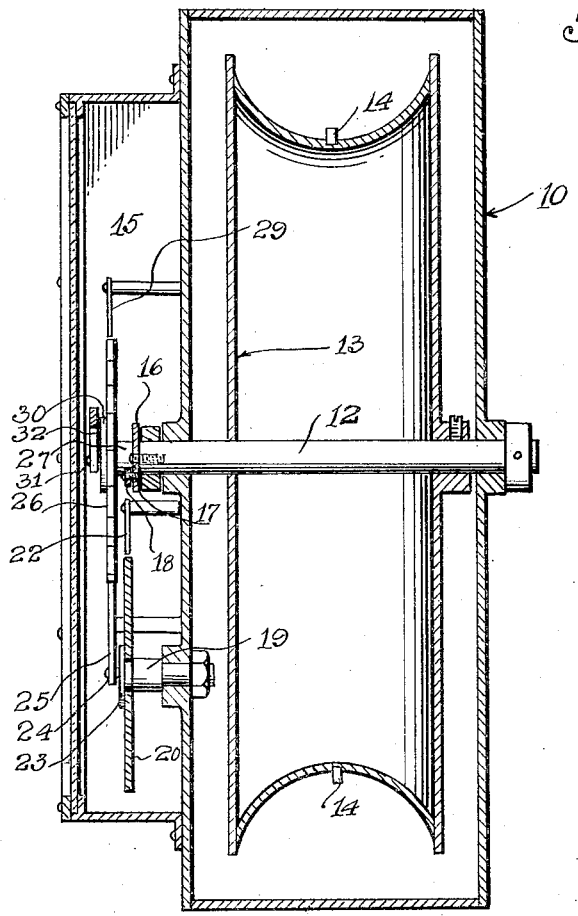
Figure 4 is a section on the line 4—4 of Figure 1.
Figure 5:
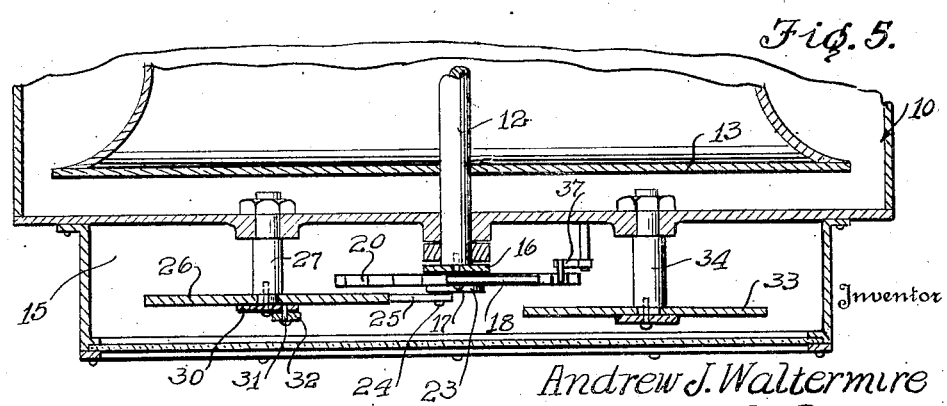
Figure 5 is a section on the line 5—5 of Figure 1.

Referring to the drawings, 10 designates a casing, which is illustrated as rectangular in form, the casing being open at the bottom or one end, as at 11. Disposed within the casing and mounted upon a shaft 12 is a wheel 13 which, where the device is used for rope or like materials, has a concave rim provided with outwardly projecting studs 14. This wheel may be of any suitable circumference, as for instance it may have a circumference of one foot, one yard or any other unit of measure, but I will assume that the wheel has a circumference of one foot. This wheel is mounted on the shaft 12, to rotate therewith as previously described, which shaft extends through suitable bearings in side walls of the housing 10.

Mounted upon one side wall of the housing 10 is a second housing or case 15 having a transparent glass face. The shaft 12 projects into this housing 15, and mounted upon the shaft to rotate therewith is a disk 16 having a wrist pin 17, and pivotally mounted upon this wrist pin is a pawl 18. It will be obvious that the pawl will be given a reciprocating movement by the revolution of the wheel 13 and shaft 12.

Coacting with the pawl 18 and mounted upon a shaft 19 is an indicating wheel or dial 20 which has ratchet teeth 21 upon its circumference. The wheel 20 is illustrated as having fifteen ratchet teeth. I do not wish to be limited to this, however. Each ratchet tooth is numbered on this wheel 20 from 1 to 15, the transparent wall of the casing 15 permitting the numbers to be easily read. Coacting with the wheel is a hand or pointer 22 and the number on the wheel is read at this point.

Mounted upon the shaft 19 is a disk 23 having a wrist pin 24 which is connected to the pawl 25. This pawl coacts with an indicating wheel or dial 26 mounted upon a shaft 27. This indicating wheel or dial has also preferably fifteen teeth 28, and it will be obvious that this dial 26 will be advanced one step upon each complete rotation of the dial 20. These ratchet teeth are numbered from 15 to 225 and these numbers are read in connection with a fixed hand or pointer 29. Mounted upon the shaft 27 is a crank disk 30, and mounted upon the wrist pin 31 on this disk is a pawl 32, which pawl coacts with a dial wheel 33 mounted upon a shaft 34 and having ratchet teeth 35 with which the pawl engages. There are again fifteen ratchet teeth on this wheel, these teeth being numbered from 225 to 3375. These numbers are read in connection with a hand or pointer 36.

With the mechanism as described, it is obvious that a complete rotation of the wheel 13 will cause the indicating wheel 20 to move one point and the numeral 1, for instance, will be displayed in connection with the pointer 22. When fifteen feet of rope has passed the wheel 13, the ratchet wheel 20 will have rotated one complete revolution and this will have shifted the ratchet or indicating wheel 26 one point so that the dials or indicating wheels 20 and 26 will both display the numeral 15. A second complete rotation of the indicating wheel 20 will cause a second movement of the wheel 26 one step and the numeral 30 will be displayed by the wheel 26, showing that 30 feet of rope have been measured. A complete rotation of the wheel 26 will cause a one-step movement of the indicating wheel or dial 33 and 225 feet will be displayed by the dial 33 opposite the hand or pointer 36, and so on. This mechanism is thus capable of measuring 3375 feet and it is obvious that if the wheel 13 is a foot in diameter the measuring device will measure in terms of yards.

Preferably some means will be provided for the purpose of preventing any reverse movement of the dials, and I have indicated a lock 37 for this purpose. Preferably the rim of the wheel 13 will be provided with outwardly projecting rubber pins 14, as previously described, so as to have tractive engagement with the rope, but I do not wish to be limited to this, as other means for tractively engaging the rope may be provided.

Where the instrument is to be used for measuring cloth or the like, the wheel will be preferably flat-faced, as seen in Figure 3, where the wheel is designated 13ª, and this flat face is provided with rubber pins 14ª. This form of wheel may be used for measuring cloth or other material laid upon a counter, and the device may also be used for measuring boards, and in this case the device is run over the board from end to end.

I claim:—

1. A measuring device of the character described including a housing having an opening, a wheel mounted in the housing and having its perimeter extending through the opening, the wheel being formed for tractive engagement with the article to be measured, a shaft extending through the casing upon which the wheel is mounted, said shaft having a crank, a pawl mounted upon the crank at the end of the shaft, a plurality of dial wheels each having ratchet teeth upon its circumference, each wheel having a pawl associated therewith eccentrically supported with relation to the axle center of the corresponding dial wheel, the butt end of the pawl being rotatable with the wheel around the axis of the wheel and the free end of the pawl engaging the teeth of the next succeeding dial wheel, pawls preventing reverse movement of the dial wheels, and pointers coacting with each of said dial wheels.

2. A measuring device of the character described including a housing having an opening, a wheel mounted in said housing and having its perimeter extending through the opening, the wheel being formed to have tractive engagement with the article to be measured, a shaft extending through the housing and upon which the wheel is mounted for simultaneous rotation, and a counting mechanism supported within the housing with which the shaft is operatively connected.

3. A measuring device of the character described including a housing having an opening, a wheel mounted in said housing and having its perimeter extending through the opening, the wheel being formed to have tractive engagement with the article to be measured, a shaft extending through the casing and upon which the wheel is mounted, said shaft carrying a crank, a pawl mounted upon the crank at the end of the shaft, a second casing having a transparent wall, a dial wheel mounted within the second casing and having ratchet teeth upon its circumference with which said pawl is adapted to engage, the teeth being numbered, a crank mounted upon the shaft of the dial wheel and having a pawl mounted thereon, a second dial wheel having a series of teeth with which the last named pawl is adapted to engage, the teeth being numbered, the shaft of the second dial wheel carrying a crank and a pawl mounted thereon, a third dial wheel having teeth upon its circumference with which the last named pawl engages, the teeth being numbered, and pointers coacting with each of said dial wheels.

In testimony whereof I hereunto affix my signature.

ANDREW J. WALTERMIRE.